United States Patent [19]
Kondo

[11] Patent Number: 6,075,457
[45] Date of Patent: Jun. 13, 2000

[54] RADIO SELECTIVE CALLING RECEPTION SYSTEM AND METHOD

[75] Inventor: Hisashi Kondo, Shizuoka, Japan

[73] Assignee: NEC Corporation, Tokyo, Japan

[21] Appl. No.: 08/997,671

[22] Filed: Dec. 23, 1997

[30] Foreign Application Priority Data

Dec. 26, 1996 [JP] Japan .................................... 8-347014

[51] Int. Cl.⁷ ................................................ H04Q 1/00
[52] U.S. Cl. .................................... 340/825.44; 455/38.1
[58] Field of Search ............ 340/825.44; 455/38.1–38.4, 455/566

[56] References Cited

U.S. PATENT DOCUMENTS

| | | | |
|---|---|---|---|
| 4,821,021 | 4/1989 | Ide et al. ............................ | 340/825.44 |
| 5,043,718 | 8/1991 | Shimura ............................. | 370/825.44 |
| 5,436,619 | 7/1995 | Yun .................................... | 340/825.44 |
| 5,872,521 | 2/1999 | Lopatukin et al. ................. | 340/825.44 |

FOREIGN PATENT DOCUMENTS

| | | |
|---|---|---|
| 5-63630 | 3/1993 | Japan . |
| 8-248212 | 4/1998 | Japan . |

*Primary Examiner*—Seema S. Rao
*Attorney, Agent, or Firm*—Scully, Scott, Murphy & Presser

[57] ABSTRACT

A radio selective calling reception system, which is a reception system for a radio selective calling receiver for receiving a selective call number and a message signal following the selective call number, and displaying a received message, includes a storage section, a division information storage section, a message division section, and a display section. The storage section stores received messages. The division information storage section selects a desired message from the stored messages, and stores division information for a plurality of divided message portions. The message division section divides the received message in accordance with the stored message division information. The display displays the divided message portions. A radio selective calling reception method using the above radio selective calling reception system is also disclosed.

2 Claims, 12 Drawing Sheets

FIG.4

| ADN 1 | M1 | | MESSAGE | |
|---|---|---|---|---|
| ADN 2 | M2 | | MESSAGE | |
| | | | | |
| ADN 1 | M3 | | MESSAGE | |
| | | | | |
| ADN 3 | M4 | D1 | MESSAGE 1 | |
| ADN 3 | M4 | D2 | MESSAGE 2 | |
| ADN 3 | M4 | D3 | MESSAGE 3 | |
| | | | | |
| ADN 3 | M4 | D4 | MESSAGE 4 | |
| ADN 3 | M4 | D5 | MESSAGE 5 | |
| | | | | |
| ADN 4 | M5 | D1 | MESSAGE 1 | |
| ADN 4 | M5 | D2 | MESSAGE 2 | |
| | | | | |
| ADN 4 | M5 | D3 | MESSAGE 3 | |
| ADN 4 | M5 | D4 | MESSAGE 4 | |
| ADN 4 | M5 | D5 | MESSAGE 5 | |
| | | | | |
| ADN 4 | M5 | D6 | MESSAGE 6 | |
| | | | | |
| ADN 5 | M6 | D1 | MESSAGE 1 | |
| | | | | |
| ADN 5 | M6 | D2 | MESSAGE 2 | |
| | | | | |
| ADN 5 | M6 | D3 | MESSAGE 3 | |
| | | | | |
| ADN 1 | M7 | MESSAGE | | |
| ADN 2 | M8 | MESSAGE | | |
| ADN 2 | M9 | MESSAGE | | |

AVAILABLE MEMORY AREA

FIG.5

| ADDRESS | 3 | MDF 1 | MDN 1 | DCN 1 | MDN 2 |
|---|---|---|---|---|---|
| DCN 2 | MDN 3 | DCN 3 | MDN 4 | DCN 4 | MDN 5 |
| DCN 5 | | | | | |

FIG.6

| ADDRESS 1 | RSF 1 | MDF 1 | MCF 1 | MMF 1 |
|---|---|---|---|---|
| ADDRESS 2 | RSF 2 | MDF 2 | MCF 2 | MMF 2 |
| ADDRESS 3 | RSF 3 | MDF 3 | MCF 3 | MMF 3 |
| ADDRESS 4 | RSF 4 | MDF 4 | MCF 4 | MMF 4 |
| ADDRESS 5 | RSF 5 | MDF 5 | MCF 5 | MMF 5 |

FIG.7

| ADDRESS | 3 | MDN 1 | DCN 1 | MDN 2 | DCN 2 |
|---|---|---|---|---|---|
| MDN 3 | DCN 3 | MDN 4 | DCN 4 | MDN 5 | DCN 5 |
| ADDRESS | 4 | MDN 1 | DCN 1 | MDN 2 | DCN 2 |
| MDN 3 | DCN 3 | MDN 4 | DCN 4 | MDN 5 | DCN 5 |
| MDN 6 | DCN 6 | | | | |
| ADDRESS | 5 | MDN 1 | DCN 1 | MDN 2 | DCN 2 |
| MDN 3 | DCN 3 | | | | |

FIG.8

| ADDRESS 1 | RSF 1 | MDF 1 | MCF 1 |
|---|---|---|---|
| ADDRESS 2 | RSF 2 | MDF 2 | MCF 2 |
| ADDRESS 3 | RSF 3 | MDF 3 | MCF 3 |
| ADDRESS 4 | RSF 4 | MDF 4 | MCF 4 |
| ADDRESS 5 | RSF 5 | MDF 5 | MCF 5 |

FIG.9

| ADDRESS 3 | MDN 1 | DCN 1 | MMF 1 | MDN 2 | DCN 2 |
|---|---|---|---|---|---|
| MMF 2 | MDN 3 | DCN 3 | MMF 3 | MDN 4 | DCN 4 | MMF 4 |
| MDN 5 | DCN 5 | MMF 5 | | | |
| ADDRESS 4 | MDN 1 | DCN 1 | MMF 1 | MDN 2 | DCN 2 |
| MMF 2 | MDN 3 | DCN 3 | MMF 3 | MDN 4 | DCN 4 | MMF 4 |
| MDN 5 | DCN 5 | MMF 5 | MDN 6 | DCN 6 | MMF 6 |
| ADDRESS 5 | MDN 1 | DCN 1 | MMF 1 | MDN 2 | DCN 2 |
| MMF 2 | MDN 3 | DCN 3 | MMF 3 | | |

RADIO SELECTIVE CALLING RECEPTION SYSTEM AND METHOD

BACKGROUND OF THE INVENTION

1. Field of the Invention

The present invention relates to a radio selective calling reception system and method and, more particularly, to a radio selective calling reception system and method which can control received messages and display messages.

2. Description of the Related Art

In a radio selective calling reception system of this type, as the information-orientated society expands, a larger amount of message information is processed, and each message tends to be long. Messages used in a radio selective calling receiver of this type include information such as weather forecasts, stock prices, and exchange rates. There is a tendency to increase the number of services of providing such messages.

Message read methods used in a system of this type include a method of sequentially reading message information from the first character or page of a message, a method of sequentially reading message information from the last character or page of a message, and the like.

In a system of this type, however, a large amount of message information tends to be transmitted at once, and each message tends to be long. When, therefore, a long message is read, and its contents are to be checked, the location of necessary information in the long message must be specified. This operation takes much time.

In addition, unnecessary messages may be sent by some information provision services, posing a problem in terms of the effective use of the memory for storing messages.

SUMMARY OF THE INVENTION

The present invention has been made in consideration of the above situation, and has as its object to provide a radio selective calling reception system and method which allow a user to quickly check a long message as well as a short message.

It is another object of the present invention to prevent a received message from being divided in wrong division units depending on the type of received message.

It is still another object of the present invention to selectively protect and delete messages.

In order to achieve the above objects, according to the first aspect of the present invention, there is provided a radio selective calling reception system having a radio unit for performing reception processing and display processing in accordance with received messages transmitted from a base station, comprising:

storage means for storing the received messages;

message division means for selecting a desired received message from the storage means and dividing the message into a plurality of message portions;

divided message storage means for storing the divided message portions obtained by the message division means; and display means for displaying the divided message portions.

According to the second aspect of the present invention, the system of the first aspect further comprises determination means for, when the desired received message is to be divided into the divided message portions, determining whether to store the divided message portions. The divided message portions are stored in a storage area of the divided message storage means therethrough in response to determination information output from the determination means.

According to the third aspect of the present invention, there is provided a radio selective calling reception system having a radio unit for performing reception processing and display processing in accordance with received message signals transmitted from a base station, comprising:

storage means for storing the received message signals;

message signal division means for selecting a desired received message signal from the storage means and dividing the message signal into a plurality of message signal portions;

divided message signal storage means for storing the divided message signal portions, obtained by the message signal division means, in a storage area of the storage means;

display means for displaying the divided message signal portions;

determination means for, when the desired message signal is to be divided into a plurality of message signal portions, determining whether to store each of the divided message signal portions in the storage area of the divided message signal storage means; and discarding means for discarding a specific divided message signal portion, of the divided message signal portions, from the divided message signal storage means in accordance with a determination signal output from the determination means.

According to the fourth aspect of the present invention, there is provided a radio selective calling reception system having a radio unit for performing reception processing and display processing in accordance with received messages transmitted from a base station, comprising:

storage means for storing the received messages in a storage area on the basis of address information;

message division means for selecting a desired received message from the storage means and dividing the message into a plurality of message portions;

divided message storage means for storing the divided message portions, obtained by the message division means, in a storage area;

display means for displaying the divided message portions;

determination means for, when the desired message is to be divided into a plurality of message portions, determining whether to store each of the divided message portions in the storage area of the divided message storage means; and discarding means for discarding a specific divided message portion, of the divided message portions, from the divided message storage means in accordance with determination information output from the determination means.

According to the fifth aspect of the present invention, the divided message portion in the fourth aspect is stored in the storage area of the divided message storage means in accordance with a division instruction from the message division means, and is read out from the divided message storage means in accordance with a determination output from the determination means.

According to the sixth aspect of the present invention, the divided message portion in the fourth and fifth aspects is stored in the storage area of the divided message storage means in response to a determination signal representing a determination result obtained by the determination means.

According to the seventh aspect of the present invention, the received messages in the fourth to sixth aspects are stored in the storage area of the divided message storage means in units of the received messages in accordance with types of the received messages.

According to the eighth aspect of the present invention, the system of the fourth to seventh aspects further comprises number setting means for setting, in each selective call signal as the address information transmitted from the base station, information indicating whether to store the divided message portion in the storage area of the divided message storage means.

According to the ninth aspect of the present invention, there is provided a radio selective calling reception method in a radio selective calling reception system having storage means for performing reception processing and display processing in accordance with received messages transmitted from a base station, comprising the steps of:

storing the received messages in the storage means in advance;

selecting a desired received message from the stored received messages, and dividing the selected message into a plurality of divided message portions;

storing the divided message portions in a divided message storage area of the storage means; and displaying the divided message portions.

According to the 10th aspect of the present invention, there is provided a radio selective calling reception method in a radio selective calling reception system having storage means for performing reception processing and display processing in accordance with received messages transmitted from a base station, and control means for controlling the storage means, comprising the steps of:

storing the received messages in the storage means in advance;

selecting a desired received message from the stored received messages, and dividing the selected message into a plurality of divided message portions;

causing the control means to determine whether to store the divided message portions;

storing the divided message portions in a storage area of the storage means in response to a determination result obtained by the control means; and displaying the divided message portions.

According to the 11th aspect of the present invention, there is provided a radio selective calling reception method in a radio selective calling reception system having storage means for performing reception processing and display processing in accordance with received messages transmitted from a base station, and control means for controlling the storage means, comprising the steps of:

storing the received messages in the storage means in advance;

selecting a desired received message from the storage means, and dividing the selected message into a plurality of divided message portions;

storing the divided message portions in the storage means;

displaying the divided message portions;

causing the control means to determine whether to store the divided message portion in a specific storage area of the storage means; and discarding a specific one of the divided message portions from the specific storage area of the storage means in accordance with a determination result obtained by the control means.

According to the 12th aspect of the present invention, there is provided a radio selective calling reception method in a radio selective calling reception system having storage means for performing reception processing and display processing in accordance with received messages transmitted from a base station, and control means for controlling the storage means, comprising the steps of:

storing the received messages in the storage means in advance;

selecting a desired received message from the storage means, and dividing the selected message into a plurality of divided message portions;

storing the divided message portions in a storage area of the storage means on the basis of address information indicating the received message;

displaying the divided message portions stored in the storage area of the storage means;

when the desired received message is to be divided into a plurality of divided message portions, causing the control means to determine whether to store the divided message portions in the storage area of the storage means; and discarding a specific one of the divided message portions from the storage means in accordance with a determination result obtained by the control means.

According to the 13th aspect of the present invention, there is provided a radio selective calling reception method in a radio selective calling reception system having storage means for performing reception processing and display processing in accordance with received messages transmitted from a base station, and control means for controlling the storage means, comprising the steps of:

storing the received messages in the storage means in advance;

selecting a desired received message from the storage means, and dividing the selected message into a plurality of divided message portions in accordance with a message division instruction output from the control means;

storing the divided message portions in a specific storage area of the storage means in units of selective call signals each of which is address information indicating the received message stored in the step of storing the received messages;

displaying the divided message portions stored in the step of storing the divided message portions;

further selecting the received message stored in the storage means by referring to the divided message portions displayed in the step of displaying the divided message portions, dividing the selected divided message portion into a plurality of divided message portions, and determining whether to store the divided message portion in the specific storage area of the storage means;

discarding a specific one of the divided message portions from the specific storage area of the storage means in accordance with the message division instruction output from the control means.

According to the 14th aspect of the present invention, there is provided a radio selective calling reception method in a radio selective calling reception system having storage means for performing reception processing and display processing in accordance with received messages transmitted from a base station, and control means for controlling the storage means, comprising the steps of:

storing the received messages in the storage means in advance;

selecting a desired received message from the storage means, and dividing the selected message into a plurality of divided message portions in accordance with a message division instruction output from the control means;

storing the divided message portions in a specific storage area of the storage means in units of selective call signals each of which is address information indicating the received message stored in the step of storing the received messages;

displaying the divided message portions stored in the step of storing the divided message portions;

further selecting the received message stored in the storage means by referring to the divided message portions displayed in the step of displaying the divided message portions, dividing the selected divided message portion into a plurality of divided message portions, and determining whether to store the divided message portion in the specific storage area of the storage means; and comparing a length of a next received message received from the base station with a length of the divided message portion stored in the specific storage area of the storage means in accordance with the message division instruction output from the control means, and executing the division step for the next message to divide the next message into a plurality of divided message portions when it is determined upon comparison that the length of the next message is larger than the length of the stored divided message portion.

Still further, according to the 15th aspect of the present invention, there is provided a radio selective calling receiver which is capable of controlling received messages and display messages, comprising:

(a) a signal reception unit including an antenna for receiving a radio signal, a radio reception section for demodulating the radio signal received by said antenna, a wave shaping section for wave-shaping the demodulated signal, and a decoder section for converting a signal issued from said wave shaping section into a readable digital signal;

(b) a control unit for properly processing and controlling the digital signal converted by said decoder section;

(c) a message division information memory unit connected to said control unit so as to store divided character count data which is message division information of an address contained in the radio signal received;

(d) a message memory unit connected to said control unit so as to store the received message;

(e) a function setting memory unit connected to said control unit so as to store an address information;

(f) a display unit connected to said control unit so as to sequentially display divided/stored message portions; and (g) a switch unit connected to said control unit and used for setting function of the radio selective calling receiver and setting message division.

According to the present invention having the above aspects, the user can perform, by himself/herself, message division setting for a long message stored in the message storage means. Division information for divided message portions is stored, and the message portions can be stored on the basis of the stored information. The user can therefore accurately and quickly check a necessary message with the same operation as that required to check a short message.

In addition, the present invention includes the control section for dividing a received message into a plurality of message portions in accordance with message division information, storing the message portions, and displaying them. The user can therefore accurately and quickly check a necessary message of received messages with the same operation as that required to check a short message.

According to the present invention, when a message is to be divided into a plurality of message portions, the user can perform setting for determining whether to store each divided message portion. Information indicating the execution/inexecution of division is stored, With this operation, messages can be displayed after divided message portions are stored and discarded. Therefore, the message memory section can be effectively used, and a necessary message can be accurately and quickly checked.

According to the present invention, since the system includes the storage means for storing message division information to be stored upon changing a message division method in accordance with the types of received messages, messages can be prevented from being divided in wrong division units depending on the types of received messages.

According to the present invention, message division information to be stored and information indicating whether to store a message in the memory are set in units of selective call numbers, and the set information can be stored in units of selective call numbers. In a message receiving operation, therefore, erroneous division of an address for which the execution of message division is not set can be prevented.

According to the present invention, a plurality of divided received message portions allow messages to be independently deleted and protected, messages can be selectively protected and deleted.

According to the present invention, with message division information to be stored, it can be determined in accordance with the type of a received message whether to perform message division, thereby preventing division of a message which loses its meaning when it is erroneously divided.

The above and many other advantages, features and additional objects of the present invention will become manifest to those versed in the art upon making reference to the following detailed description and accompanying drawings in which preferred embodiments incorporating the principles of the present invention are shown by way of illustrative examples.

BRIEF DESCRIPTION OF THE DRAWINGS

FIG. 4 is a view showing how messages and the like are stored in the memory after the execution of message division;

FIG. 5 is a view showing the storage state of a message division information virtual memory;

FIG. 6 is a view showing the storage state of a function setting memory;

FIG. 7 is a view showing the storage state of a message division information memory;

FIG. 8 is a view showing the storage state of the function setting memory having a message memory function;

FIG. 9 is a view showing the storage state of the message division information memory;

DETAILED DESCRIPTION OF THE PREFERRED EMBODIMENTS

Several preferred embodiments of the radio selective calling reception system and method of the present invention will be described below with reference to the accompanying drawings.

Figure 1:
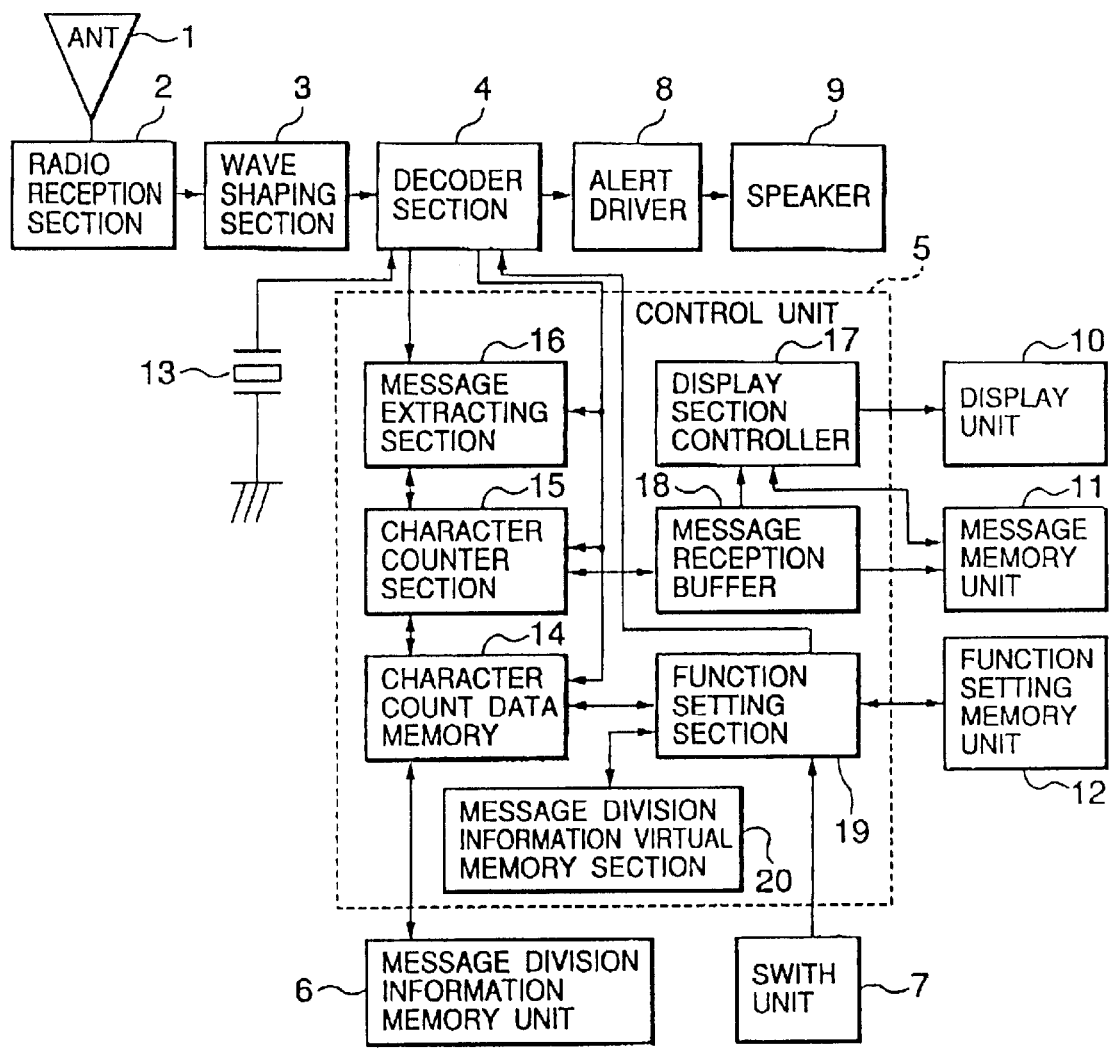
FIG. 1 is a block diagram showing the arrangement of a radio selective calling receiver used in an embodiment of the present invention.

FIG. 1 is a block diagram showing the arrangement of a radio selective calling receiver of an embodiment of the present invention. Referring to FIG. 1, the reception unit of the radio selective calling receiver of this embodiment is constituted by an antenna (ANT) 1 for receiving a radio signal, a radio reception section 2 for demodulating the signal received by the antenna (ANT) 1, a wave shaping section 3 for wave-shaping the demodulated output, and a decoder section 4 for converting the signal from the wave shaping section 3 into a readable digital signal.

The decoder section 4 can load address information from a function setting memory section 12 through a function setting section 19 in a control section 5. The decoder section 4 compares the readable digital signal as the received signal with the address information. If they coincide with each other, the decoder section 4 sends a message signal following the reception address to the control unit 5.

The control unit 5 loads divided character count data, which is the message division information as the address received from a message division information memory unit 6, into a character count data memory 14, and sets the divided character count data in a character counter section 15. The received message is processed by a message extracting section 16 to be sent to the character counter section 15 unitized of characters.

The character counter section 15 stores the received message in a message reception buffer 18 up to the predeterminedly set divided character count. When divided character count reaches the set divided character count, the divided message is transferred from the message reception buffer 18 to a message memory unit 11.

Upon reception of the message, the divided message memory unit 11 sets new divided character counter data in the character counter section 15, and performs the same operation as described above.

In this embodiment, when the message is completely received, the divided/stored message portions are sent from a display unit controller 17 to a display unit 10. With this operation, the divided/stored message portions can be sequentially displayed on the display unit 10.

In addition, the information about message division, which is stored in the message division information memory unit 6 and the function setting memory unit 12, is also used in a message receiving operation. When a message at a designated address is received, message division is performed in accordance with the message division information memory unit 6.

When no message division is performed, the received message is only stored in the memory area of the message division information memory unit 6, together with the reception address number. The detected address is temporarily stored in a so-called virtual memory state, and message division positions are set. Thereafter, the detected address is stored in the memory area, together with the message division information.

In addition, the message division information memory unit 6 can set the execution/inexecution of message division by using a message division flag MDF. Upon completion of message division, the message division information memory unit 6 sets the message division flag MDF in the function setting memory unit 12 to the "execution of message division".

The message division information memory unit 6 also changes the message division flag MDF corresponding to the address stored in the message division information virtual memory area to the "execution of message division". If, for example, the address stored in a message division information virtual memory section 20 becomes address "1", the message division flag MDF is set to the "execution of message division". Thereafter, the virtual memory section 20 is cleared to be used for the next message division setting operation.

The information about message division, stored in the message division information memory unit 6 and the function setting memory unit 12, is also used in a message receiving operation. When a message at a designated address is received, message division is performed in accordance with the message division information memory unit 6.

When the message is not divided, the received message is only stored in the memory, together with the reception address number. When the message is divided, each address number, each message division number, and each divided message portion are stored in the message memory unit 11 in the order named. Each divided message portion is displayed like each individual message on the display unit 10.

In this manner, the user of the radio selective calling receiver can set message division. Messages required for the user can therefore be easily read out, and the time taken to read out messages can be shortened.

In addition, a switch unit 7 is used for setting the function of the radio selective calling receiver and setting message division according to the present invention. On the other hand, reference numeral 13 represents a clock which has such a function as generating a timing clock for establishing synchronization with the received signal sent from the wave shaping section 3 and further which is used as a processing clock for internal processing. Reference numeral 8 denotes an alert driver.

Figure 16:
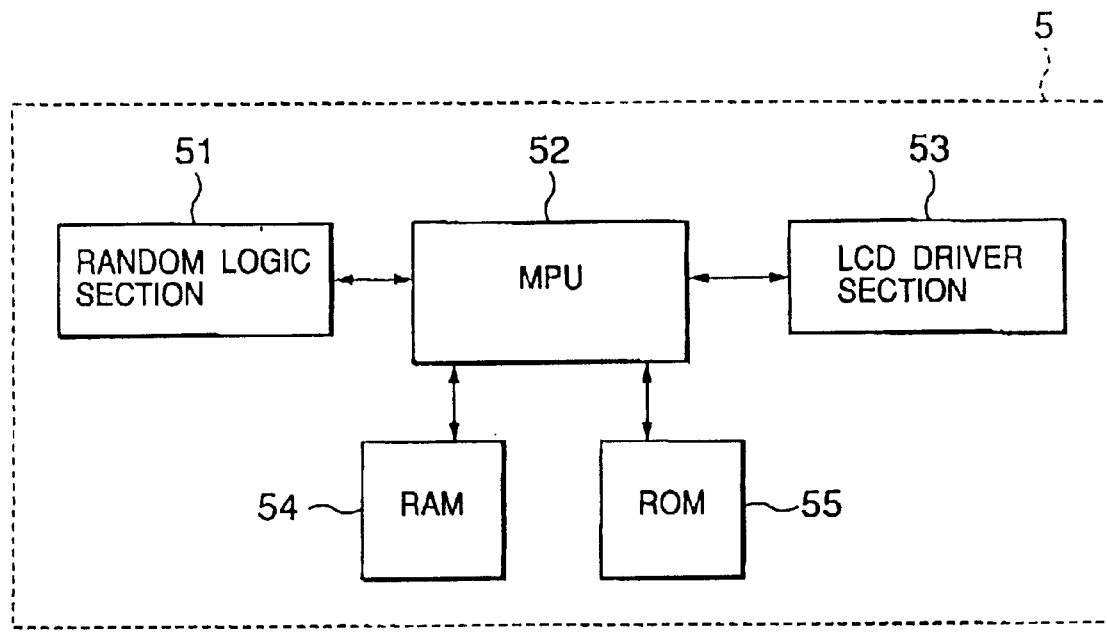
FIG. 16 is a block diagram showing the arrangement of a control section in FIG. 1 at the IC level.

FIG. 16 is a block diagram showing an arrangement of the control unit 5 at the IC level. The control unit 5 is constituted by a random logic section 51, a micro processing unit (to be referred to as an MPU hereinafter) 52, an LCD driver section 53, a RAM 54, and a ROM 55.

In the random logic section 51, the message extracting section 16 and the character counter section 15 are constituted by random gates and used to extract a message and count the number of characters according to message division information.

The MPU 52 functions as a function setting section 19 in accordance with a program stored in the ROM 55, and performs control and processing for the respective sections, e.g., control on the LCD driver section 53, storage of a received message in the message memory section 11, processing of a signal from a switch unit 7, control on the RAM 54, and control on the message division information memory unit 6.

The LCD driver section 53 corresponds to the display unit controller 17, and displays message information read out from the message memory unit 11 as display information in accordance with a display signal upon reception of an instruction from the MPU 52. The LCD driver section 53 also displays received message information on the display unit 10 in accordance with a display signal sent as display data in a message receiving operation.

The RAM 54 is divided into a plurality of areas, which are respectively used as the character count data memory 14 for storing message division information from the message division information memory unit 6, the virtual memory section 20 for temporarily storing message division setting information in a message division information setting operation, and the message reception buffer 18 used as a temporary location of a received message.

Figure 2:
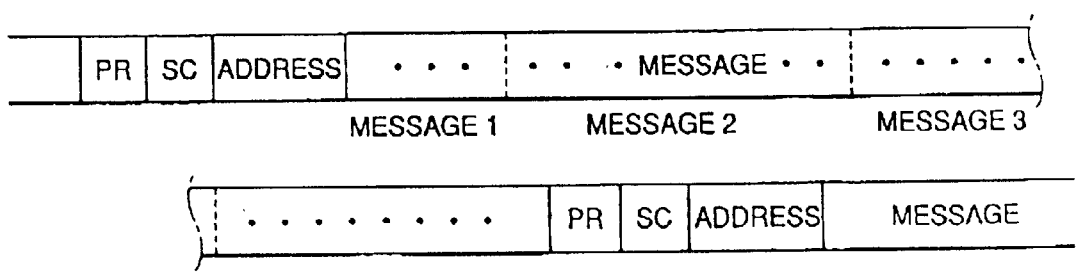
FIG. 2 is a view showing the format of communication data used in the embodiment of the present invention.

FIG. 2 shows the data format of a received signal used in the present invention. In this embodiment, a selective call signal is constituted by a PR signal for establishing bit synchronization, a synchronization code word signal (SC signal) for establishing word synchronization, the address of a radio selective calling receiver to be called, and message information. Pieces of message information following each address constitute a message to the radio selective calling receiver to be called.

As shown in FIG. 2, pieces of message information following each address vary in length, as needed. That is, the message length is variable. The end of each message is discriminated by a message end signal or an address signal. One or a plurality of addresses are set for each radio selective calling receiver to be used as address information for calling a desired radio selective calling receiver.

FIGS. 3 to 9 show the states of the respective storage areas, i.e., the message memory, the message memory upon message division, the virtual memory, the function setting memory, and the message division information memory, in the data write mode, together with message information.

Referring to FIGS. 3 to 9, each message division flag (MDF) indicates the execution/inexecution of message division. Each message category flag (MCF) indicates that the corresponding information is information consisting of only tones, numerical information, or binary data. Each reception status flag (RSF) indicates either personal reception or information reception. Each message memory flag (MMF) indicates whether the corresponding message is stored or not. Each message-division number (MDN) is the division number of each message. Each divided character count (DCN) indicates the number of characters into which the corresponding message is divided.

Figure 3:
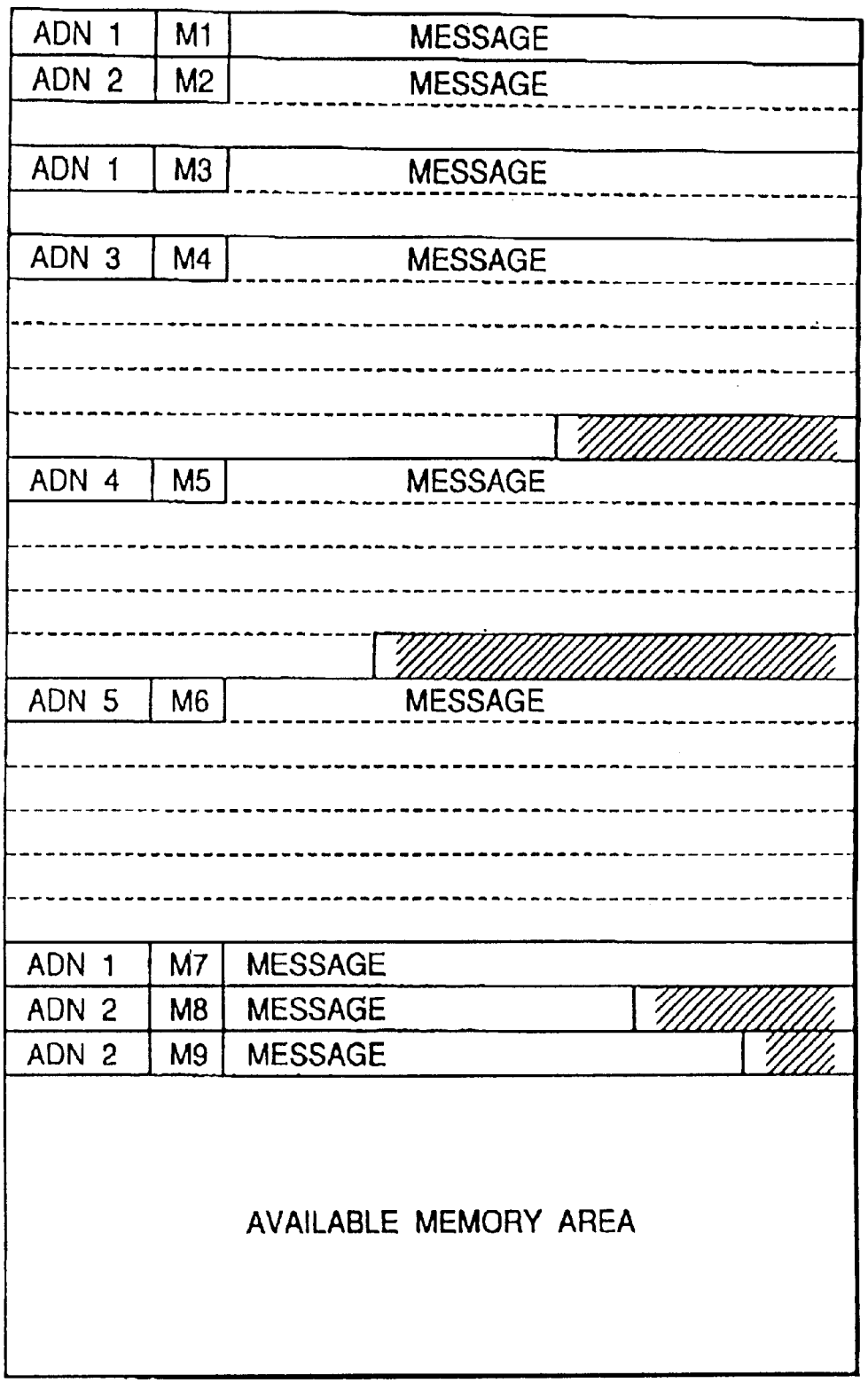
FIG. 3 is a view showing how messages and the like are stored in a memory before the execution of message division.

FIG. 3 shows the state of the memory in the message memory unit 11, and more specifically, the internal state of the message memory unit 11 in a case in which no message division is performed. In the message memory unit 11, received messages are stored in the memory, together with the reception address numbers.

FIG. 4 shows the storage state of the message memory unit 11 in a case in which message division is performed.

Each address number (ADN), each message division number (M), and each divided message portion are stored in the memory in the order named. Each divided message portion is displayed like each individual message on the display unit 10 in FIG. 1.

FIG. 5 shows the message storage state of the message division information virtual memory section 20. The address detected by the function setting section 19 in FIG. 1 is stored in the message division information virtual memory section 20. After message division positions are set, the address is stored in the message division information memory unit 6, together with message division information. In addition, in the message division information virtual memory section 20, the message division flag MDF is also set to the "execution of message division", and the message division flag MDF in the function setting memory unit 12 is set to the "execution of message division" upon completion of message division.

FIG. 6 shows flags such as reception status flags (RSF) corresponding to the addresses in the function setting memory unit 12. As shown in FIG. 6, the message division flag MDF corresponding to the address stored in the message division information virtual memory section 20 is changed to the "execution of message division". If, for example, the address stored in the message division information virtual memory section 20 is address "1", the message division flag MDF "1" indicates the "execution of message division". Thereafter, the message division information virtual memory section 20 is cleared to be used for the next message division setting operation.

FIG. 7 shows the state of the memory in a case in which addresses "3" to "5" are stored in the message division information memory unit 6 in FIG. 1. FIG. 8 shows the storage state of the function setting memory unit 12 in the state of addresses "3" to "5". In this case, a message memory function is set. FIG. 9 shows a case in which a message memory flag is set in the message division information memory unit 6 for each piece of message division character count information.

The operation of the present invention will be described next with reference to the flow charts of FIGS. 10 to 15, together with FIGS. 1 to 9.

Message division processing and message division setting processing will be described first with reference to the flow charts of FIGS. 10 and 11.

Referring to these flow charts, in step (to be abbreviated to S) 101, the menu button of the switch unit 7 is depressed. The flow then advances to S102 to display a function menu on the display unit 10. In S103, a message division setting function on the menu display is selected.

If message division function setting is selected in S201 in this case, the radio selective calling receiver can display a message selection window on the display unit 10. The flow then advances to S302, in which the messages in the memory are sequentially displayed by depressing a selection button in the display unit 10. In this case, either an "up" bottom or a "down" button is selected to set a desired message to be subjected to message division. When the message to be subjected to message division is set, the flow advances to S104 and S203, in which a determination button is depressed to determine the message to be subjected to message division.

In this embodiment, when the message to be subjected to message division is determined, the flow advances to S204 to display the first character of the message. In S205, the cursor is moved to the start character position of message division with the selection button. In S206, the determination button is depressed to determine the start character of message division.

The flow then advances to S207, in which the user operates the selection button switch to move the cursor to the desired end character of the message to be divided. When the determination button is depressed to determine the end character position in S208, detection of the address of the selected message, selection of a message division position, and message division position selection end processing are performed in S105 to S107, thus completing one message division setting operation.

Figure 11:
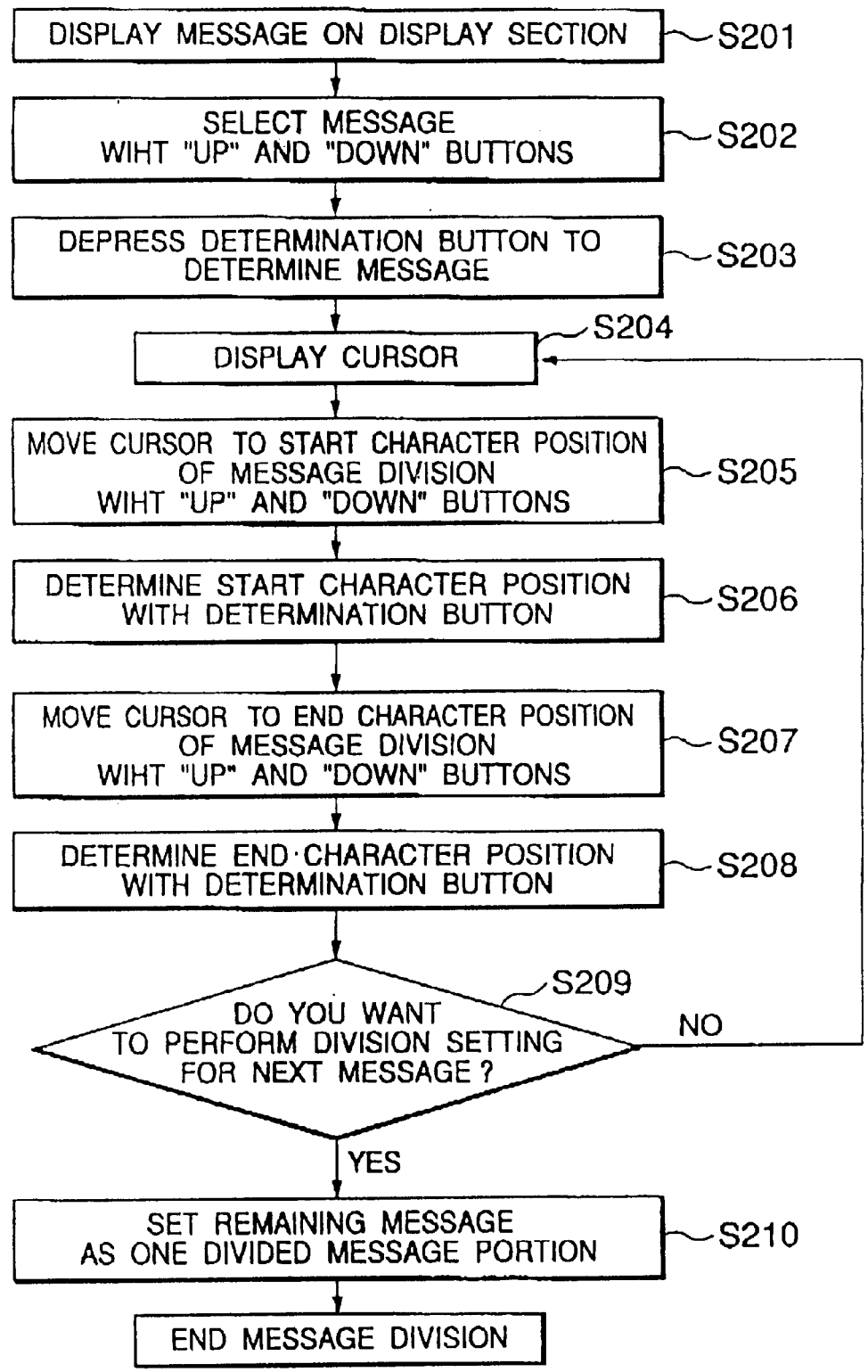
FIG. 11 is a flow chart showing message division setting processing in the embodiment of the present invention.

When setting of the message to be divided is to be continued, the processing in S205 to S209 in FIG. 11 is repeated. More specifically, the user repeatedly performs the following processing: moving the cursor to the start character position of, message division with the "up" and "down" buttons; determining the start character position with the determination button; moving the cursor to the end character position of message division with the "up" and "down" buttons; determining the end character position with the determination button; and determining whether to perform the next message division setting operation. When the flow advances to S210, the user determines the start character position and end character position of message division, and can repeat this processing until selection of message division positions is complete.

Figure 10:
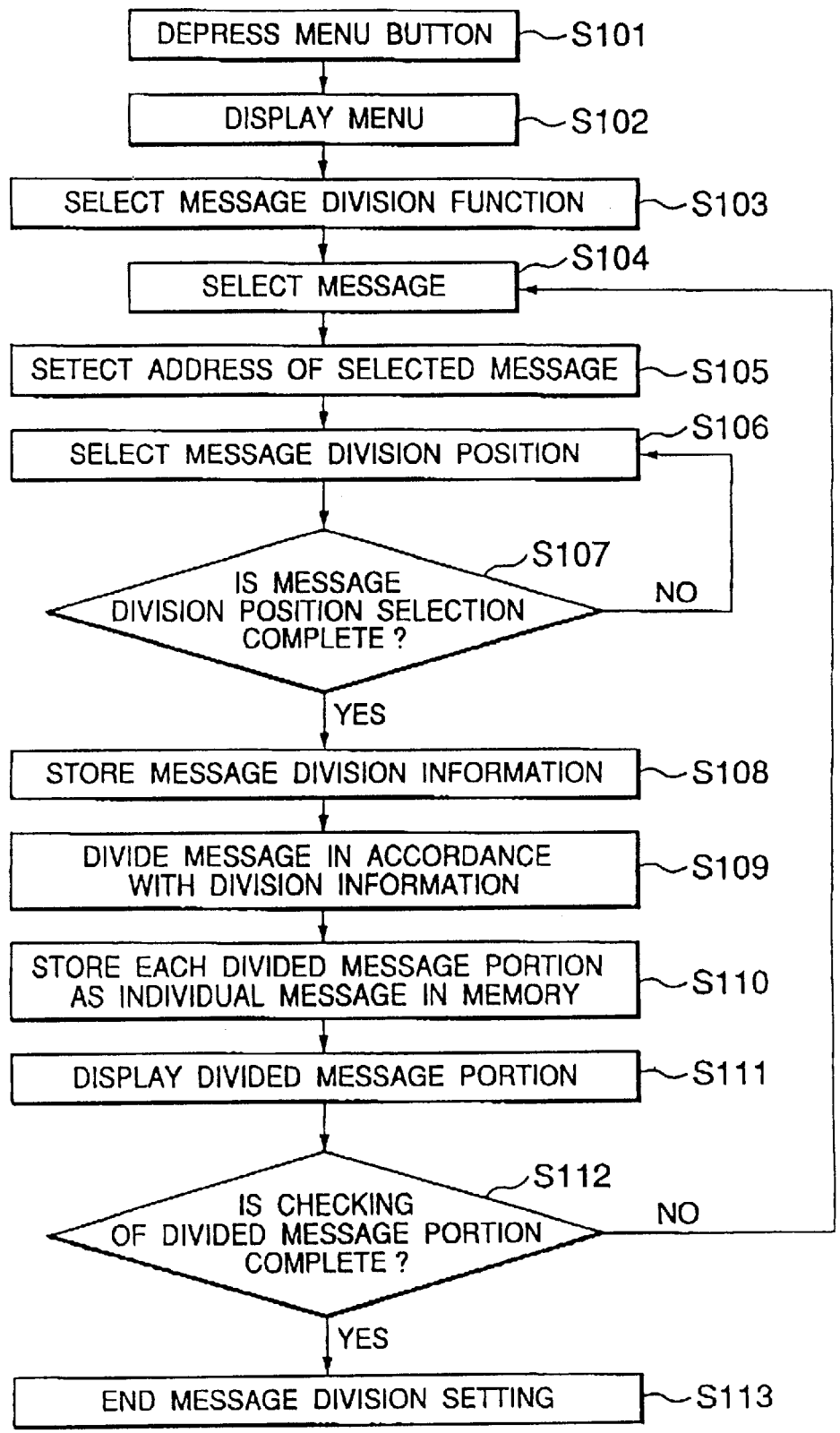
FIG. 10 is a flow chart showing message division processing in the embodiment of the present invention.

When the above processing is complete, the flow advances to S108 in FIG. 10 to process the message division information and store the resultant message division information in the storage area of the message division information memory. After the message division information is stored, the flow advances to S109 to divide the message according to the message division information. In S110, each divided message portion is stored as an individual message in the storage area of the message memory unit 11. After the divided message portions are stored, the flow advances to Sill to sequentially display the divided message portions on the display unit 10 to allow the user to check them.

If the user finds no problem in the divided message portions upon checking the displayed message portions, the message division processing, is complete. If there is a problem in message division, the user repeats the processing in S104 to S112, i.e., storing message division information, dividing the message in accordance with the division information, storing each divided message portion as an individual message in the memory, displaying each divided message portion, and checking each divided message portion, until desired message division is complete.

Figure 12:
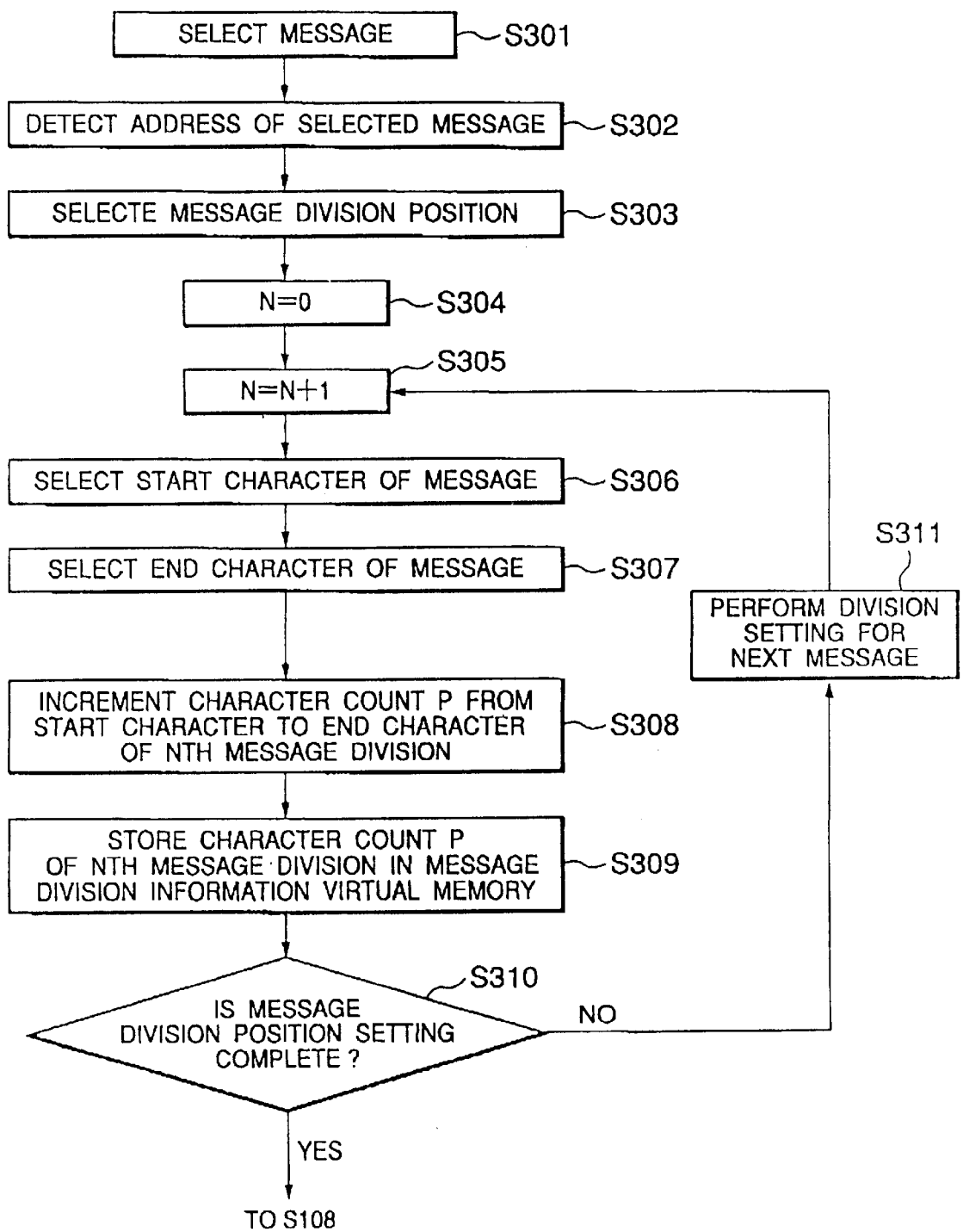
FIG. 12 is a flow chart showing internal processing for message division setting in the embodiment of the present invention.

FIG. 12 is a flow chart for internal processing to be performed for message division setting. According to this flow chart, after a message is selected in S301, the flow advances to S302 to detect the address of the message. As shown in FIG. 5, the detected address is temporarily stored in the memory area of the virtual memory section 20, and is stored in the memory area of the message division information memory unit 6, together with the message division information, after message division position setting is complete.

In addition, the virtual memory section 20 sets the message division flag MDF to the "execution of message division", and then sets the message division flag MDF in the function setting memory unit 12 to the "execution of message division" upon completion of message division.

When message division position setting is to be performed in S303, the flow advances to S304 to set the value of a message division number N to 0. The value of the message division number N (Number) is then incremented to update the value of the message division number N, thereby setting the value of the message division number N. The message division number N indicates the ordinal number of the corresponding divided message portion.

Subsequently, the flow advances to S306 and S307 to select the start character position and end character position of the message portion indicated by the message division number N. In S308, a character count P from the start character position to the end character position of the Nth message division is calculated by counting.

The flow advances to S310 to store the counted character count P of the message division in the memory area of the virtual memory section 20, together with the message division number N.

If message division position setting is further required, the message division number is incremented in S305, and the next message division position is set in the processing in S305 to S310. This operation is repeated until message division position setting is complete. The end of message division position setting is determined as follows. In message division position setting, it is checked whether the set end character position coincides with the end character of the message. If they coincide with each other, the processing of message division position setting is complete.

In this embodiment, when message division position setting is complete, the address, the message division numbers, and the message division information, which are stored in the storage area of the virtual memory section 20, are transferred to the message division information memory unit 6.

In this embodiment, as described above, the user of the radio selective calling receiver performs message division setting to easily read a message necessary to the user. In addition, the time taken to read the message can be shortened.

Figure 13:
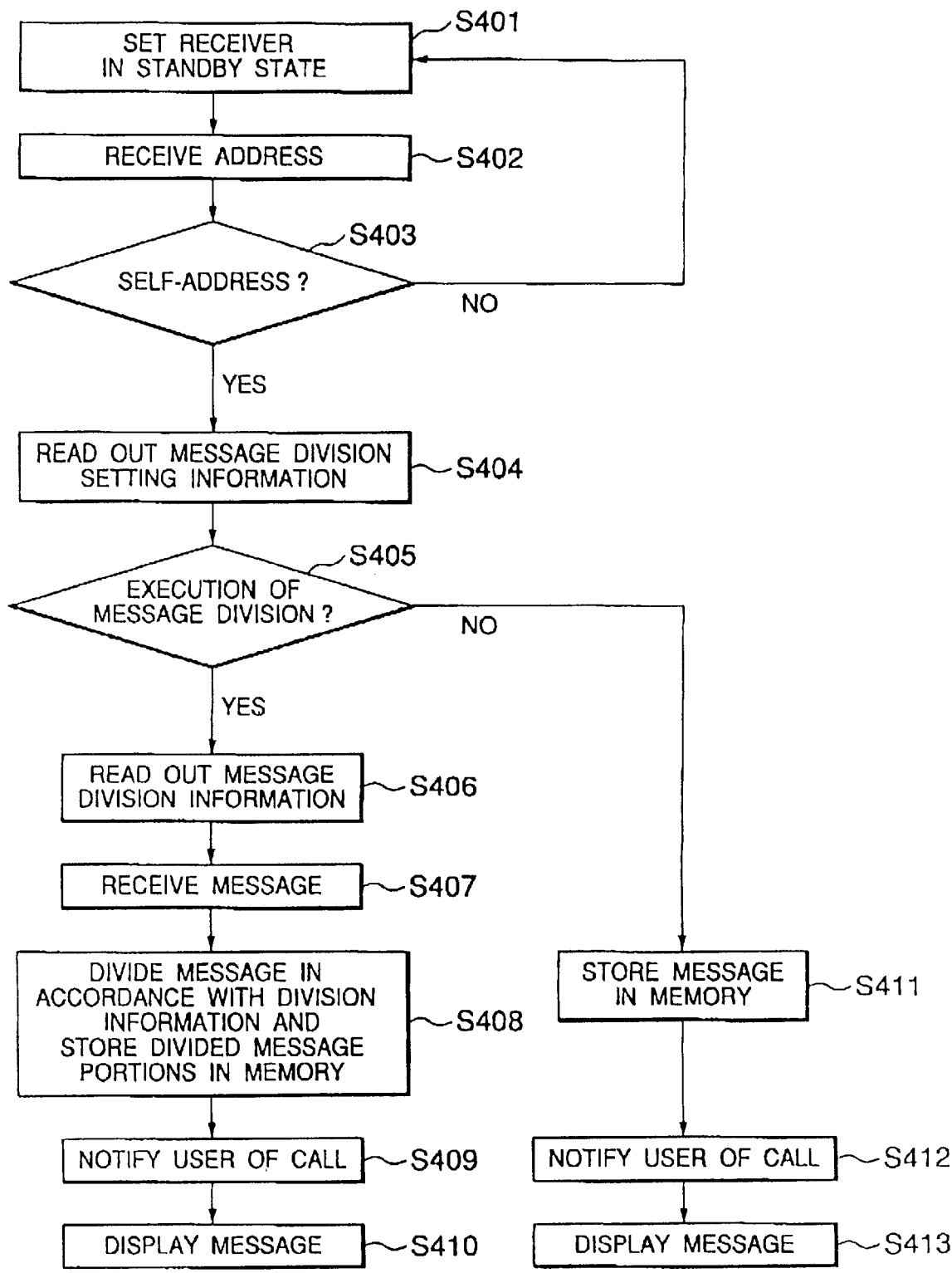
FIG. 13 is a flow chart showing message reception processing in the embodiment of the present invention.

An operation to be performed when a message is to be received, divided, and stored will be described next. One or a plurality of addresses are assigned to each radio selective calling receiver to be used to call a desired radio selective calling receiver. FIG. 13 is a flow chart showing message reception processing. An operation for division processing of a received message is performed in accordance with the flow chart for message reception processing in FIG. 13.

When the radio selective calling receiver in the call wait state, i.e., the standby state, receives an address in a selective call signal like the one shown in FIG. 2 in S401 and S402, the flow advances to S403 to compare the address loaded in the function setting memory unit 12 with the address of the received signal. If they do not coincide with each other, the flow returns to S401 to set the receiver in the standby state.

If the address of the received signal coincides with the address loaded in the function setting memory unit 12, the flow advances to S404 to load a message division flag, a message category flag, and a reception status flag which correspond to the above address in the function setting memory unit 12.

If it is determined in S405 that the message division flag is set to the "execution of message division", the flow advances to S406 to send the message division information from the message division information memory unit 6 to the control unit 5. If the "inexecution of message division" is determined, the message is stored in the memory area of the message memory unit 11 in S411 without execution of division of the received message.

The flow then advances to 5412 to sound a speaker 9 to notify the reception of a call. In 5413, the user of the radio selective calling receiver is notified of the call, and the message is displayed on the display unit 10. In S405, the execution/inexecution of message division is determined.

If the execution of message division is determined, the flow advances to S407 to receive the received message. In S408, the message is divided in accordance with the message division information, and each divided message portion is stored in the memory area of the message memory unit 11. Thereafter, the flow advances to S409 to sound the speaker 9. In this case, the user of the radio selective calling receiver is notified of the call, and the flow advances to S410 to display the received message on the display unit 10. After the message is displayed in S410, the flow returns to S401 to set the receiver in the standby state.

In the memory map of the message division information memory unit 6 in which message division information is stored, message division information including divided message numbers (MDN) and divided character counts (DCN) are stored in units of addresses, as shown in FIG. 7. In the memory map of the function setting memory unit 12, the reception status flag RSF, the message division flag (MDF), and the message category flag (MCF) are stored in units of addresses, as shown in FIG. 8.

The reception status flag (RSF) indicates whether the set address is for personal use or information reception. Information reception is an information service for providing weather forecasts, traffic information, stock prices, exchange rates, and the like. In this service, since the format and length of each message are predetermined in many cases, determination on a required message position or a character count which-makes it easy to read the message is facilitated.

In such an information reception service, since each message is sent with a specific address, setting of message division information can be performed for each address. The message category indicates the type of message. For example, the types of messages include Tone Only: notification only by a sound, Numeric: a message expressed by a number, symbols, and the like, α-Numeric: a message expressed by letters. In addition, messages expressed by kanji characters, and kana characters, and the like are available.

The message division flag indicates the execution/inexecution of message division setting in units of addresses. Message division is performed in accordance with a character count set with a message division number. If no message division is executed, the received address, the received message number, and the message are stored in the memory area of the message memory unit 11 in the order named, as shown in FIG. 3. When message division is executed, the received address, the received message number, the divided message number, and the divided message portion are stored in the memory area of the message memory unit 11 in the order named, as shown in FIG. 4.

Figure 14:
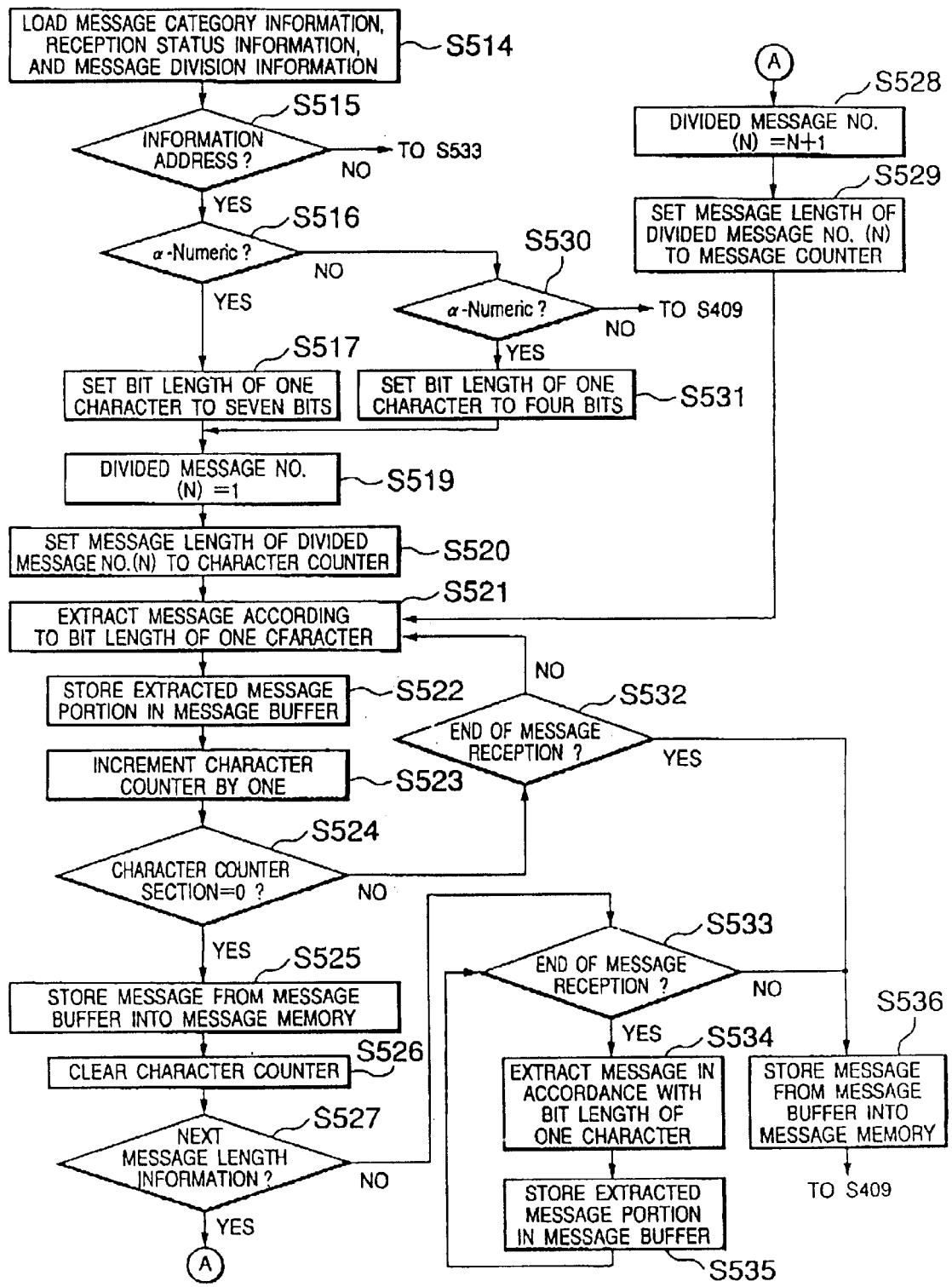
FIG. 14 is a flow chart showing message division storage processing in the embodiment of the present invention.

Successively, message division and storage of divided message portions in the memory are explained in accordance with the flow chart for message division processing in FIG. 14. According to the flow chart of FIG. 14, in S514, message category information, reception status information, and message division information are loaded from the function setting memory unit 12 and the message division information memory section 6.

The flow then advances to S515 to check whether the reception status is "information reception". If No in S515, the message is received without message division. The message is then extracted by the message extracting section 16 in accordance with the bit length of one character, and the received message is stored in the storage area of the message reception buffer 18 until message reception is complete. When message reception is complete, the flow advances to S536 to store the message from the message reception buffer 18 into the memory area of the message memory unit 11.

In this embodiment, as in personal reception, when neither transmission message count nor transmission format is determined, message division is not executed for the following reason. In personal reception, neither character count and nor transmission form is determined. For this reason, if message division is performed, it is highly possible that the user cannot understand the contents of the message.

When the reception status is "information reception", a message category is determined. The flow advances to S516 to determine whether the set message category is "α-Numeric", i.e., the message is constituted by alphanumerics. If YES in S516, the bit length of one character is set to seven bits.

If NO in S516, it is checked in S530 whether the message category is "Numeric", i.e., the message is constituted by numeric values other than alphanumerics. If YES in S530, the flow advances to S531 to set the bit length of one character to four bits.

If NO in S516 and S530, it is determined that the message category is "Tone Only", and the flow shifts to S409 in the flow chart for message reception processing in FIG. 13. The subsequent operation is performed in accordance with this flow chart.

The flow then advances to 5520 to set the character count of the first message in the character counter section 15 in FIG. 1. In S521, the message is extracted in units of characters by the message extracting section 16 in accordance with the bit length of one character.

If the message category is "Numeric", the message is extracted in units of characters each constituting of four bits. If the message category is "α-Numeric", the message is extracted by the message extracting section 16 in units of characters each consisting of seven bits. The message extracted in this manner is stored in the storage area of the message reception buffer 18 in S522.

In this embodiment, every one character is stored in the message reception buffer 18, the character counter section 15 is decremented by one, and it is checked in S524 whether the value of the message counter is 0. If NO in S524, it is checked in S532 whether the message has come to an end. If YES in S532, the message in the message reception buffer 18 is stored in the memory area of the message memory unit 11. In this case, the flow shifts to S409 in the flow chart for message reception processing in FIG. 13. The subsequent operation is performed in accordance with the flow chart of FIG. 13.

If NO in S532, the flow returns to S521 to extract the message in units of characters in accordance with the bit length of one character. In addition, the operations in S408 to S411 in the flowchart of FIG. 13 and in S516 in the flow chart of FIG. 14 are repeated until the value of the character counter section 15 becomes 0 or the message comes to an end.

If the value of the character counter section 15 is "0", the flow advances to S526 to store the message from the message reception buffer 18 into the memory area of the message memory unit 11. The value of the character counter section 15 is then cleared.

When the above processing is performed, it is checked in S527 whether message length information is present. If YES in S527, the flow advances to S529 to set the message length in the message reception buffer 18. The operations in S521 to S527 are then repeated until no message length information is present.

If no message length information is present, it is checked in S533 whether message reception is complete. If YES in S533, the flow advances to S536, in which the message in the message reception buffer 18 is stored in the memory area of the message memory unit 11. The flow then shifts to S409 in the flow chart for message reception processing in FIG. 13. The subsequent operation is performed in accordance with this flow chart.

If message reception is not complete, the flow advances to S534 to extract the message in units of characters in accordance with the bit length of one character. In S535, the message is stored in the storage area of the message reception buffer 18. In this manner, the operations in S533 to S535 are repeated until message reception is complete.

When message reception is complete, the message in the message reception buffer 18 is stored in the memory area of the message memory unit 11 in S536. The flow then shifts to S409 in the flow chart for message reception processing in FIG. 13. The subsequent operation is performed in accordance with this flow chart.

Since each divided message portion is stored like an individual message in the message memory unit 11, each divided message portion is stored or erased.

In the function setting memory unit 12 in FIG. 1, message memory flags are set in the memory, as shown in FIG. 6, and message memory flags are set in the message division information memory in units of pieces of message divided character count information, as shown in FIG. 9.

Figure 15:
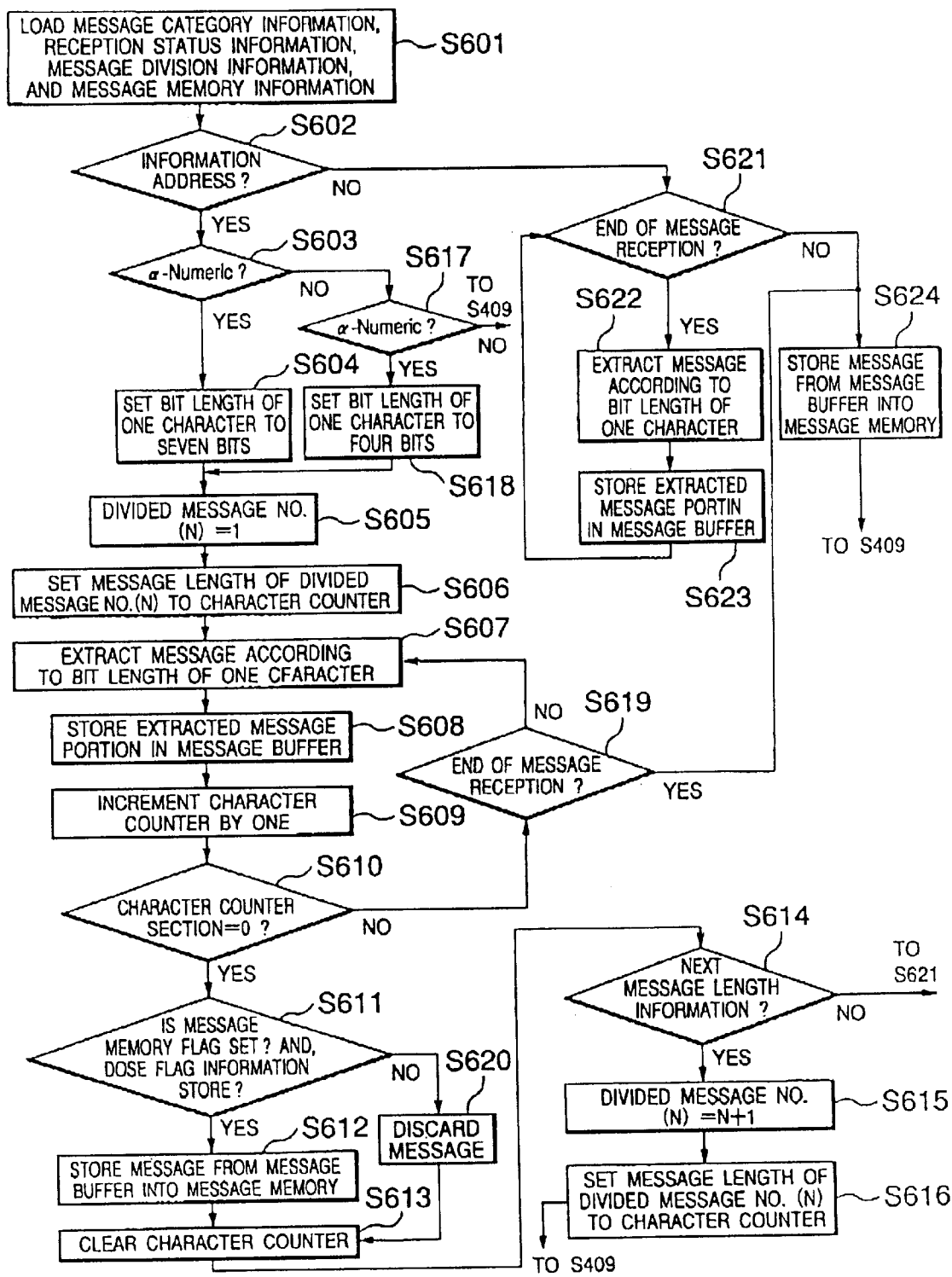
FIG. 15 is a flow chart showing message division storage processing in the embodiment of the present invention.

FIG. 15 is a flow chart for message division storage processing. According to this flow chart, in S601, message category information, reception status information, message division information, and message memory information are loaded. In S602, it is checked whether the current address is an information address.

If YES in S602, the flow advances to S603 to check whether the message category is "α-Numeric". The subsequent processing is almost the same as that in FIG. 14. Different points will be mainly described below. In NO in S602, it is checked in S621 whether message reception is complete. If YES in S621, the message is extracted by the message extracting section 16 in accordance with the bit length of one character. The flow then advances to S623 to store the message in the message buffer. Thereafter, the processing in S621 to S623 is repeated. If NO in S621, the flow advances to S624 to store the message from the message reception buffer 18 into the message memory unit 11.

The processing in S603 to S610 in FIG. 15 is the same as that in S516 to S524 in FIG. 14, and the processing in S617 and S618 is the same as that in S530 and S531. The processing in S619 and S624 in FIG. 15 is the same as that in S532 and S536 in FIG. 14.

Referring to FIG. 15, if it is determined in S610 that the value of the character counter is "0", the flow advances to S611 to check whether a message memory flag is set. If a message memory flag is set, it is checked whether the flag information is stored in the memory. If it is determined in S611 that the flag information is stored in the memory, the flow advances to S612 to store the message from the message reception buffer 18 into the message memory unit 11. In S613, the counter of the message extracting section 16 is cleared. Thereafter, the flow advances to S624 to store the message from the message reception buffer 18 into the message memory unit 11. The flow returns to S409 in FIG. 13 to notify the user of the call again. The flow then advances to S410 to display the message on the display unit 10.

If it is determined in S611, upon checking the message memory flag, that the message is not stored in the storage area, the flow advances to S620 to discard the message. In S613, the character counter is cleared. After the character counter is cleared in S613, the flow advances to S621 to check whether the next message length information is present.

If YES in S621, the divided message NO. is updated, and a message corresponding to the number N of the updated divided message NO. is set in the character counter section 15. After the message is set in the character counter section 15, the flow returns to S409 in FIG. 13 to notify the user of the call again. The flow then advances to S410 to display the message on the display unit 10.

In this embodiment, since message memory flags are set in the function setting memory unit 12 and the message division information memory section 6, any unnecessary message portion in divided message portions can be discarded from the message memory unit 11. The message memory unit 11 can therefore be effectively used. In addition, the time taken to read a necessary message can be shortened.

What is claimed is:

1. A radio selective calling reception method in a radio selective calling reception system having storage means for performing reception processing and display processing in accordance with received messages transmitted from a base station, and control means for controlling said storage means, comprising the steps of:

storing the received messages in said storage means in advance;

selecting a desired received message from said storage means, and dividing the selected message into a plurality of divided message portions in accordance with a message division instruction output from said control means;

storing the divided message portions in a specific storage area of said storage means in units of selective call signals each of which is address information indicating the received message stored in the step of storing the received messages;

displaying the divided message portions stored in the step of storing the divided message portions;

further selecting the received message stored in said storage means by referring to the divided message portions displayed in the step of displaying the divided message portions, dividing the selected divided message portion into a plurality of divided message portions, and determining whether to store the divided message portion in the specific storage area of said storage means; and comparing a length of a next received message received from the base station with a length of the divided message portion stored in the specific storage area of said storage means in accordance with the message division instruction output from said control means, and executing the division step for the next message to divide the next message into a plurality of divided message portions when it is determined upon comparison that the length of the next message is larger than the length of the stored divided message portion.

2. A radio selective calling receiver which is capable of controlling received messages and display messages, comprising:

(a) a signal reception unit including an antenna for receiving a radio signal, a radio reception section for demodulating the radio signal received bp said antenna, a wave shaping section for wave-shaping the demodulated signal, and a decoder section for converting a signal issued from said wave shaping section into a readable digital signal;

(b) a control unit for properly processing, dividing by character count and controlling the digital signal converted by said decoder section;

(c) a message division information memory unit connected to said control unit so as to store divided character count data which is message division information of an address contained in the radio signal received;

(d) a message memory unit connected to said control unit so as to store the received message;

(e) a function setting memory unit connected to said control unit so as to store an address information;

(f) a display unit connected to said control unit so as to sequentially display divided/stored message portions; and (g) a switch unit connected to said control unit and used for setting function of the radio selective calling receiver and setting message division; wherein said control unit further comprises:

a message extracting section receiving the digital signal from said decoder section and extracting the received message in units of characters;

a character count data memory for loading the divided character count data from said message division information memory section;

a character counter section for setting the character count data;

a message reception buffer for storing the received message made into unitized characters by said message extracting section up to the set divided character count in accordance with the divided character count data;

a function setting section for detecting an address on the basis of a message division flag fed from said function setting memory section;

a message division information virtual memory section connected to said function setting section and storing the message division flag corresponding to the address stored in said message division information memory unit; and a display unit controller successively transferring divided message portions stored in said message memory unit after completing the message division processing of the received message, wherein the divided message portions are stored in said message memory unit when the received message made into unitized characters reaches the predetermined divided character count set in said character count section.

* * * * *